Jan. 14, 1969 W. KIRKMAN 3,421,875
APPARATUS FOR BENDING GLASS SHEETS
Filed Sept. 13, 1965

INVENTOR.
William Kirkman
BY
Nobbe & Swope
ATTORNEYS

United States Patent Office 3,421,875
Patented Jan. 14, 1969

3,421,875
APPARATUS FOR BENDING GLASS SHEETS
William Kirkman, Ottawa, Ill., assignor to Libbey-Owens-Ford Glass Company, Toledo, Ohio, a corporation of Ohio
Filed Sept. 13, 1965, Ser. No. 486,904
U.S. Cl. 65—273       7 Claims
Int. Cl. C03b 23/02

ABSTRACT OF THE DISCLOSURE

Apparatus for heating the male mold member of a press bending apparatus in which pressurized gas is piped first through the bending furnace where it absorbs heat and then to an air chamber formed behind the mold member. According to another aspect of the invention orifices are formed in the shaping surfaces of the mold and the hot gas is exhausted through them to form a cushion between the mold and the glass sheet being bent.

---

This invention relates generally to the production of curved glass sheets and more particularly to improved apparatus for bending glass sheets.

In recent years, curved glass sheets have been rather widely used as glazing closures particularly in windows for vehicles such as automobiles and the like. The employment of curved sheets for this purpose requires that the sheets be bent to rather precisely defined curvatures dictated by the configuration of the opening in which they are to be mounted and by the over-all design of the automobile. In addition, those surfaces of the sheet lying within the viewing area of the window must be free from mars or defects which would tend to interfere with clear vision through the window.

Usually, curved glass sheets intended for use in automobiles are tempered to increase their resistance to damage due to impact and to improve the breaking characteristics of the glass whereby, when broken, the tempered sheets will disintegrate into relatively small, harmless particles as opposed to the rather large, jagged pieces resulting when ordinary, untempered glass is broken.

One procedure by which curved, tempered sheets of glass may be produced is by heating flat sheets to the softening point of the glass, pressing the softened sheets to the desired curvature between complemental shaping surfaces and then chilling the sheets to rapidly reduce their temperature to a point below the annealing range of the glass.

The primary object of the present invention is to provide a novel bending apparatus for producing curved sheets of the above character on a commercial or mass production basis in a fast and efficient manner without adversely affecting the quality of the finished sheets.

Another object is to provide an improved apparatus for pressing heated sheets of glass to desired curvatures with a minimum of marring of the surfaces of the sheets.

A further object is to accomplish the above by a novel means of passing heated gases through the shaping mold.

Other objects and advantages of the invention will become more apparent during the course of the following description when read in connection with the accompanying drawings.

In the drawings, wherein like numerals are employed to designate like parts throughout the same:

Figure 1:
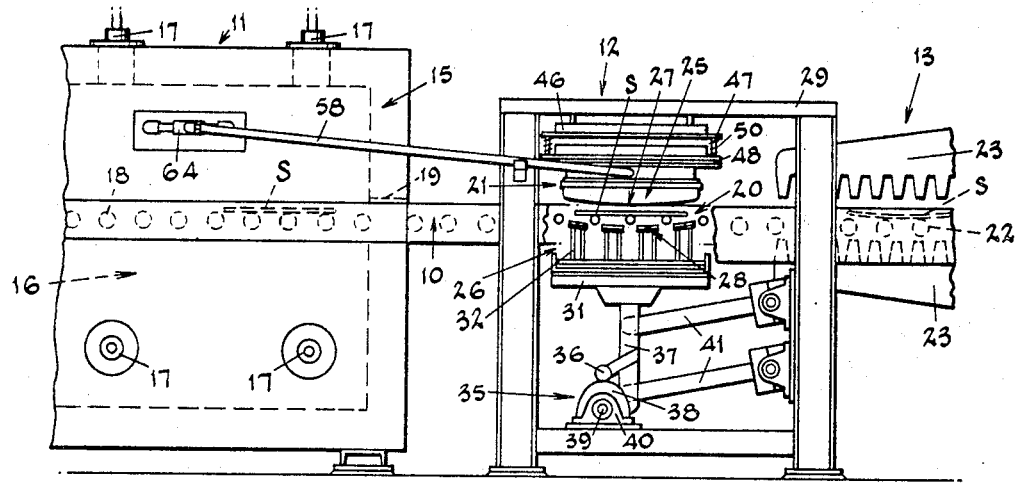
FIG. 1 is a side elevational view of a bending apparatus embodying the novel features of the present invention.

In producing curved windows for vehicles in relatively large quantities on a mass production basis, the sheets are heated, bent and subsequently tempered in a substantially continuous procedure. To this end, the sheets to be treated are moved successively along a predetermined path through a heating area, a bending area and a tempering area, which areas are contiguous so that a sheet, after moving through one area, passes immediately into and through the following area.

For the purpose of illustration, the novel features of the present invention are shown in the drawings incorporated in a bending and tempering apparatus particularly adapted for use in the production of bent, tempered glass sheets by a continuous process similar to that described above. This apparatus includes a continuous conveyor system 10 adapted to support a plurality of sheets S in a horizontal plane for movement along a predetermined path through a heating section 11, a bending section 12 and a tempering section 13 disposed end to end along the path.

In the illustrated embodiment, the heating section comprises a tunnel-type furnace 15 having a heating chamber 16 defined by walls constructed of a suitable refractory and heated by burners or equivalent heating devices 17 to bring the sheets to the proper bending temperature. The sheets S are advanced through the heating chamber 16 on a roller type conveyor 18 which forms a part of the conveyor system 10 and extends from the entrance end (not shown) of the furnace to an oppositely disposed exit end. The sheets are heated to substantially the softening point of the glass during their passage through the chamber 16 and, upon emerging from an opening 19 in the exit end of the furnace, are received on a second roller type conveyor 20, which is also part of the conveyor system 10, and are moved into the bending section 12 and past a bending means 21 which forms the sheets to the desired curvature.

After being bent, the sheets S are advanced along the path and onto a third roller type conveyor 22, also a part of the conveyor system 10, which moves the sheets into and through the tempering section 13 wherein their temperature is rapidly reduced to produce the desired temper in the glass. In the illustrated embodiment, the tempering section includes cooling means comprising so-called blast heads 23 disposed above and below the path of the moving sheets and operable to direct opposed streams of cooling fluid, such as air or the like, toward the path and against the opposite surfaces of the sheets moving therealong.

In general, the bending means 21 includes a shaping mold having male and female mold parts 25 and 26 adapted to press the heated glass sheets into the desired configuration. For this purpose, complemental interfitting shaping surfaces 27 and 28, conforming in curvature to the sheets when bent, are formed on the opposite faces of the mold parts which are movable relative to each other and to the conveyor 22 to bring the shaping surfaces into pressing engagement with the opposite sides of the heated sheets.

While the desired pressing of the sheets could be effected by moving either or both of the mold parts 25 and 26, herein the male mold part 25 is mounted on a suitable framework 29 in a substantially stationary position above the conveyor. The female mold part 26 is supported on the framework for reciprocal motion in a substantially vertical plane toward and away from the male mold part between an open position wherein the mold part 27 is located below the conveyor 20 and a closed position wherein the female mold part is disposed above the conveyor and in close proximity to the male mold part 25. With this arrangement, as a heated sheet is moved by the conveyor 20 into the bending section 12 and between the mold parts, it is lifted free of the conveyor by the female mold part 26, carried into pressing engagement with the male mold part to bend the sheet and, thereafter, returned to the conveyor and moved into the tempering section 13.

Herein, the female mold part 26 is an open ring type structure having a shaping surface 28 which engages only the marginal portions of the sheets to avoid marring those portions of the undersurface of the sheet which lie within the viewing area of the finished window. For this purpose, the mold part 26 is formed by bars 30, preferably made of metal or similar material able to withstand the high temperatures to which the mold part is subjected, arranged in a quadrangle conforming in plan to the outline of the glass sheets and having the shaping surface 28 formed on their upwardly directed sides to conform in elevation to the curvature of the sheets when bent.

In order that the female mold part 26 may move through the conveyor 20 between the open and closed positions, the longitudinally extending sides of the ring are made up of short segments of bars arranged end to end with their adjacent ends spaced apart whereby the segments pass between adjacent rollers of the conveyor 20. The bars 30 are supported in the desired position on a carriage 31 on posts 32 upstanding from the carriage.

Figure 3:
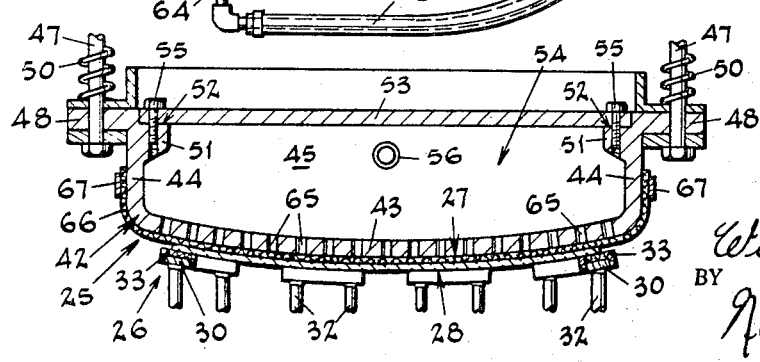
FIG. 3 is a vertical sectional view taken along line 3—3 of FIG. 2.

During bending, when the female mold part engages the undersurface of the sheets, which are at the elevated bending temperature, the relatively cool bars absorb heat from the contacted areas of the sheets. If the rate of heat absorption is high, as would ordinarily be the case, it results in chill cracks or other imperfections in the contacted areas of the glass. To avoid this, the heat transfer between the sheets and the bars 30 is retarded by providing a heat resistant, insulating covering 33 on the shaping surface 28 (FIG. 3).

Raising and lowering of the female mold part 26 toward and away from the male mold part 25 may be effected by any suitable actuating mechanism 35 coupled to the carriage 31 supporting the mold part. In the illustrated embodiment, this mechanism comprises a simple cam and follower arrangement including a cam follower 36 coupled to the carriage by means of a bar 37 depending therefrom and riding on the periphery of a disk cam 38 contoured in the usual manner to impart the desired sequence of motion to the follower 36 and thus to the carriage 31 supporting the mold part.

The disk cam 38 is fast on a shaft 39 disposed below the conveyor 20 and journaled in bearings 40 to rotate about a fixed horizontal axis extending transversely of the path. The shaft 39 is coupled to a suitable source of power (not shown) which is operable to rotate the shaft and the cam 38 carried thereby to effect the desired bending sequence.

To insure that the female mold part 26 remains in proper registry with the male mold part 25 as it moves between the open and closed positions, the bar 37 is attached to the framework 29 by parallel spaced apart elongated members 41 which, together with the bar and framework, form a four-bar linkage in which the links are arranged in a parallelogram. The bar 37 and the framework 29 form one pair of parallel links and the members 41 which are pivoted at their opposite ends to the bar 37 and the framework 29 form the other pair of parallel links.

The bending sequence, that is, the raising and lowering of the female mold part, is initiated each time a heated sheet moves into the bending section 12 and between the mold parts. This sequence may be automatically controlled by a suitable device (not shown) such as a photoelectric cell or the like, which senses the presence of a sheet in the bending section and produces a signal operable, through conventional circuitry, to activate the power source coupled to the shaft 39. The power source then rotates the shaft to move the carriage 31 and the mold part carried thereby through one raising and lowering cycle.

Since, as described above, the female mold part 26 has a shaping surface 28 which engages only the marginal portions of the sheets, the male mold part 25 is provided with a continuous shaping surface adapted to engage the entire upper surface of the sheets to insure that the inner areas of the sheets will be formed precisely to the desired curvature. This, of course, means that the upper surfaces of the sheets lying within the viewing areas of the finished window are contacted by the shaping surface of the male mold part and, being in a heat softened condition, are very apt to be damaged as a result of this contact.

For example, as noted above, when heat is absorbed by the mold part from the sheet at a high rate, a defect known as chill cracking results. The rate at which heat is absorbed by the mold part depends to a large extent upon the temperature differential between the mold part and the glass sheet. Thus the cooler the mold part, as compared to the sheet, the faster it will absorb heat from the sheet upon contact therewith. In this connection, it should be appreciated that during the bending sequence the heated sheets are in contact with the male mold part 25 for relatively short periods of time as compared to the duration of the contact between the female mold part 26 and the glass sheets and since the contact is intermittent, the male mold part is permitted to cool between each bending cycle. Therefore, during the bending operation, the male mold part is at a relatively low temperature as each sheet is brought into contact therewith. The mold part, therefore, absorbs heat at a relatively fast rate giving rise to chill cracking.

To prevent the occurrence of this defect, the present invention contemplates heating the male mold part to maintain it at a higher temperature thereby lessening the temperature differential between the mold part and the sheets. In accordance with the invention, this heating of the male mold part is effected in a simple yet efficient manner by providing an air chamber in the male mold part behind the shaping surface of the mold and introducing hot gases into this chamber to heat the mold part.

Herein the male mold part 25 comprises a cup-shaped member 42 located above the conveyor and having a generally horizontally disposed bottom or lower wall 43, substantially vertical side walls 44 and end walls as at 45 formed integrally therewith to provide a cavity in the mold part. The aforementioned male or generally convex shaping surface 27 is formed on the outer or downwardly directed face of the lower wall 43. The upper mold part is supported above the plane of the conveyor 20 on a mounting frame 46 supported on the framework 29. The mold part is attached to the mounting frame 46 by bolts 47 extending through a flange 48 formed integrally with and projecting laterally outwardly from the side walls 44 of the male mold part and through an opposed flange 49 on the mounting frame. The mold part is held in spaced relation to the mounting frame by resilient means such as coil springs 50 telescoped on the bolts and acting between opposed surfaces on the flanges 48 and 49. The coil springs 50 permit yielding of the upper mold part to prevent excessive pressure being exerted against the sheets as the femal mold part is moved into pressing engagement therewith. In addition, by tightening or loosening the bolts, thereby increasing or relieving the springs, the plane of the mold part may be adjusted relative to the plane of the conveyor.

Adjacent the open end of the member 42, an inwardly projecting rib 51 is formed integral with the inner surfaces of the side walls 44. The rib 51 is adjacent to but spaced downwardly from the upper edge of the side walls to provide shoulders 52 on which is seated a plate 53 closing the cavity in the mold part to provide a sealed air chamber 54. The plate 53 is secured to the rib 51 by machine screws 55 passing through the plate and threaded into the rib. The cavity or air chamber 54 is coupled to a source of heated gases by means of a pipe nipple 56 threaded into an end wall 45 of the mold part and extending outwardly therefrom.

Figure 2:
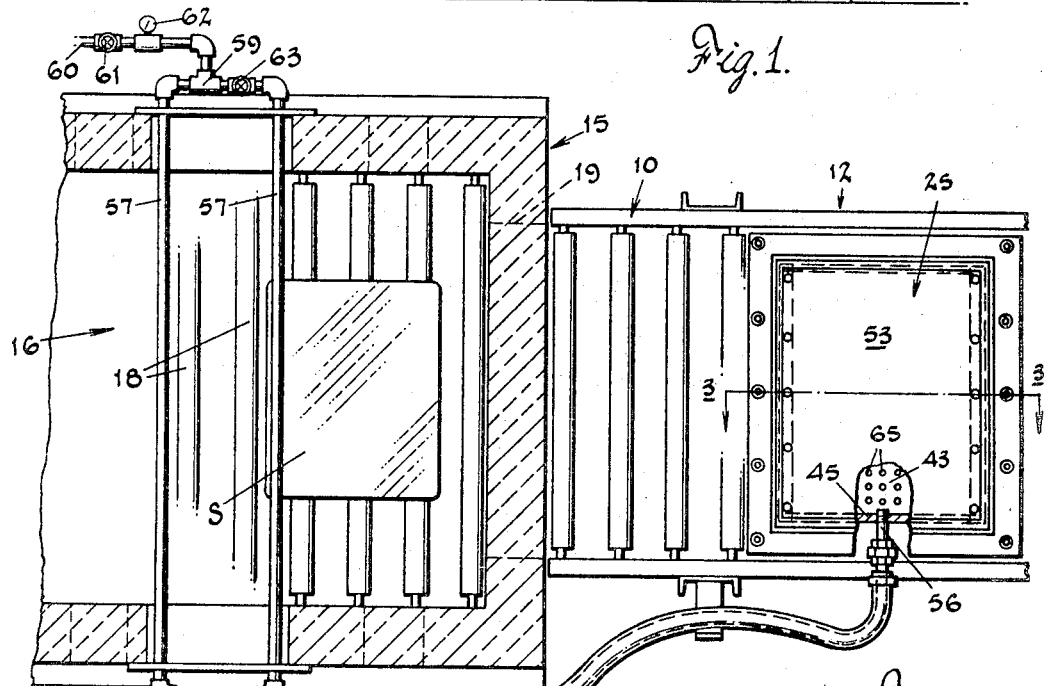
FIG. 2 is a plan view partially in section of the apparatus shown in FIG. 1.

In accordance with another aspect of the invention, the gases utilized to heat the mold part are heated by a simple arrangement which takes advantage of available heat rather than using a separate source of heat. Thus the invention contemplates heating the gases in the heating chamber 16 of the furnace 15 before being fed into the air chamber 54 in the mold part 25. To this end as shown in FIG. 2, a gas, air in the present instance, is directed through a conduit 57 from a source (not shown) at one side of the furnace and into a conduit 58 disposed at the other side of the furnace, which conduit 58 carries the heated air to the mold part. Any number of conduits 57 may be utilized to carry the air through the heating chamber of the furnace; two being shown in the present instance for purposes of illustration. These conduits 57 extend transversely across the heating chamber 16 above the conveyor 18, and are coupled by means of a pipe T 59 to a single supply pipe 60 equipped with a suitable flow regulating valve 61 and a pressure gauge 62, which pipe is in turn connected to a source of air under pressure. Further the amount of air flowing through any of the conduits 57 may be controlled by additional valves 63 disposed between the pipe T 59 and the conduits.

At the opposite side of the furnace, the conduits 57 are joined to the conduit 58 leading to the mold part through the medium of a suitable manifold coupling such as the illustrated pipe T 64. Herein, the conduit 58 leading to the mold part comprises a flexible, insulated pipe extending between the T 64 and the nipple 56 on the mold part. By utilizing a flexible conduit, the connection to the mold part does not interfere in any way with the yielding movements of the mold part.

As noted above, since the sheets are in the heat softened condition during the pressing operation, their surfaces are susceptible to being scuffed or marred as a result of contact between the mold part and the sheets. Any imperfections in the shaping surface of the mold part will be impressed into the surface of the sheets. Further, there is a tendency for the sheets to cling to the male shaping mold after being bent and as the female mold part begins its downward movement away from the male mold part.

In still another of its aspects, this invention contemplates utilizing the heated air introduced into the air chamber of the male mold part to create a cushion of air between the sheets and the shaping surface of the male mold part. This air cushion lessens the force of contact between the surface of the sheet and the shaping surface of the mold part thereby reducing the likelihood of the surface of the sheet becoming scuffed or marred and at the same time insuring that the sheet will properly clear the male mold part after being bent and rest on the female mold part as the latter moves.

To these ends, the heated air utilized to maintain the male mold part 25 at the desired temperature is directed through the shaping surface 27 of the mold part and against the uppermost surface of the sheet being bent. For this purpose, a plurality of orifices 65 are formed in the lower wall 43 of the cup-shaped member 42 through which the air, being fed into the chamber 54, flows outwardly away from the shaping surface. The heated air thus performs a dual function. It heats the mold part to prevent chill cracking of the glass due to rapid heat absorption by the mold part from the glass and further it provides a cushion of air between the uppermost surface of the sheet and the shaping surface of the mold.

To further aid in preventing marring of the surface of the sheet, the shaping surface 27 formed on the downwardly directed surface of the lower wall 43 is covered with a comparatively soft nonabrasive heat resistant material 66 such as asbestos, glass cloth or the like. This covering extends completely across the shaping surface and upwardly along the outer surface of the side walls 44 and is clamped to the mold part by a band 67 encircling the side wall.

From the foregoing it will be appreciated that a mold part constructed in accordance with the present invention permits bending of glass sheets to precisely defined curvatures by utilizing efficient press bending techniques while at the same time insuring that the surfaces of the bent sheets will be free of mars and defects.

It is to be understood that the form of the invention herewith shown and described is to be taken as a preferred embodiment of the same, and that various changes in the shape, size and arrangement of parts may be resorted to without departing from the spirit of the invention.

I claim:

1. Apparatus for bending glass sheets as the latter are moved along a predetermined path through a heating section and a bending section, a heating chamber in said heating section for heating said sheets to substantially the softening point of the glass, first and second mold parts disposed in said bending section and having complemental shaping surfaces formed thereon, means mounting said first and second mold parts for movement relative to said path towards and away from each other thereby to press said sheets between said complemental shaping surfaces, means defining an air chamber adjacent said first shaping surface, means for directing air under pressure through said heating chamber to absorb heat therefrom and into said air chamber to heat said first shaping surface on said first mold part, and means for directing said heated air from said air chamber outwardly through said shaping surface on said first mold part to form a cushion of air between said shaping surface and the sheet to be bent.

2. Apparatus for bending glass sheets as defined in claim 1, in which said last means comprises orifices extending through said first shaping surface and communicating with said air chamber.

3. Apparatus for bending glass sheets as defined in claim 1, in which said means for directing air under pressure includes a tube extending through said heating chamber.

4. Apparatus for bending glass sheets as defined in claim 1, in which said means for directing air under pressure includes a plurality of conduits extending through said heating chamber and means for selectively controlling the flow of air through each of said conduits.

5. In apparatus for bending glass sheets as the latter are moved along a predetermined path through a heating section and a bending section, a heating chamber disposed in said heating section and operable to heat the glass sheets to substantially the softening point of the glass, first and second mold parts disposed in said bending section and having complemental shaping surfaces formed thereon, means mounting said first and second mold parts for movement relative to said path toward and away from each other thereby to press the sheets between said complemental shaping surfaces, conduits disposed in and extending across said heating chamber, means defining an air chamber on said first mold part, means coupling one end of said conduit to said air chamber, means supplying gas under pressure to the opposite end of said conduit to flow therethrough and into said chamber thereby to absorb heat from said heating chamber upon passing through said heating chamber and carry the heat to said air chamber, and means for exhausting said gas from said air chamber.

6. In apparatus for bending glass sheets as the latter are moved along a predetermined path through contiguous heating and bending sections, said bending section including means defining a heating chamber surrounding said path, male and female mold parts disposed in said bending section and having complemental shaping surfaces formed thereon, means mounting said male and female mold parts for movement relative to said path toward and away from each other thereby to press said sheets between said complemental shaping surfaces, said male mold part having a cavity formed therein defining an air chamber behind said shaping surface on said male mold part, conduits disposed in and extending across said heating chamber, means coupling one end of said conduits to said air chamber, means connecting the opposite ends of said conduits to a source of air under pressure whereby air flows through said conduits and into said air chamber absorbing heat from said heating chamber and carrying the heat to said air chamber to heat the shaping surface of said male mold part, and means for exhausting said gas from said air chamber.

7. In apparatus for bending glass sheets as claimed in claim 6, wherein said shaping surface on said male mold part is provided with a plurality of orifices communicating with said air chamber through which orifices air flows from said chamber outwardly of said shaping surface and against an adjacent surface of the glass sheet being bent.

References Cited

UNITED STATES PATENTS

| | | | |
|---|---|---|---|
| 2,395,727 | 2/1946 | Devol | 65—182 |
| 3,329,494 | 7/1967 | Carson et al. | 65—275 X |

DONALL H. SYLVESTER, *Primary Examiner.*

ARTHUR D. KELLOGG, *Assistant Examiner.*

U.S. Cl. X.R.

65—25, 104, 106, 182, 275, 288, 348, 356